United States Patent [19]

Kafka et al.

[11] Patent Number: 4,847,850
[45] Date of Patent: Jul. 11, 1989

[54] CONTINUUM GENERATION WITH MINIATURIZED Q-SWITCHED DIODE PUMPED SOLID STATE LASER

[75] Inventors: James D. Kafka, Mountain View; Mark Linne, Menlo Park; Thomas M. Baer, Mountain View, all of Calif.

[73] Assignee: Spectra-Physics, Inc., San Jose, Calif.

[21] Appl. No.: 62,804

[22] Filed: Jun. 15, 1987

Related U.S. Application Data

[63] Continuation-in-part of Ser. No. 945,609, Dec. 23, 1986.

[51] Int. Cl.⁴ .............. H01S 3/091; H01S 3/09
[52] U.S. Cl. ........................... 372/71; 372/3; 372/6; 372/10; 372/13; 372/69; 372/72
[58] Field of Search ............ 372/71, 72, 69, 10, 372/13, 3, 6

[56] References Cited

U.S. PATENT DOCUMENTS

| | | | |
|---|---|---|---|
| 3,949,319 | 4/1976 | Tufield et al. | 372/41 |
| 4,308,506 | 12/1981 | Ellis | 372/13 |
| 4,486,884 | 12/1984 | White | 372/69 |
| 4,653,056 | 3/1987 | Baer et al. | 372/26 |

FOREIGN PATENT DOCUMENTS 0094786  5/1985  Japan ................. 372/10

OTHER PUBLICATIONS

Cohen et al. "A Universal Fiber-Optic (UFO) Measurement System Based on a Near-IR Fiber Raman Laser", IEEE Journal of Quantum Electronics, vol. QE-14, No. 11, Nov. 1978, pp. 855-859.

Primary Examiner—William L. Sikes
Assistant Examiner—Georgia Y. Epps
Attorney, Agent, or Firm—Paul Davis

[57] ABSTRACT

A miniaturized Q-switch is added to the resonant cavity of a compact laser diode pumped solid state laser to produce short high peak power pulses which are input into a single mode optical fiber to form a compact continuum generator. Q-switching the compact laser diode pumped solid state lasers takes advantage of the relatively high gain and short cavity length to provide a desirable combination of pulsewidth and pulse energy. Nd:YAG or Nd:YLF are useful solid state laser materials for Q-switching, or other longer lifetime rare earth ions such as erbium or holmium for greater energy storage. The Q-switch is formed of a material such as $TeO_2$, $SF_{10}$, or $LiNbO_3$ with an acoustooptic figure of merit substantially greater tha fused silica. The high peak powers of the lasers are sufficient to exceed the threshold for Raman conversion in the fiber which produces a series of red shifted bands ending in a continuum by stimulated Raman scattering.

20 Claims, 2 Drawing Sheets

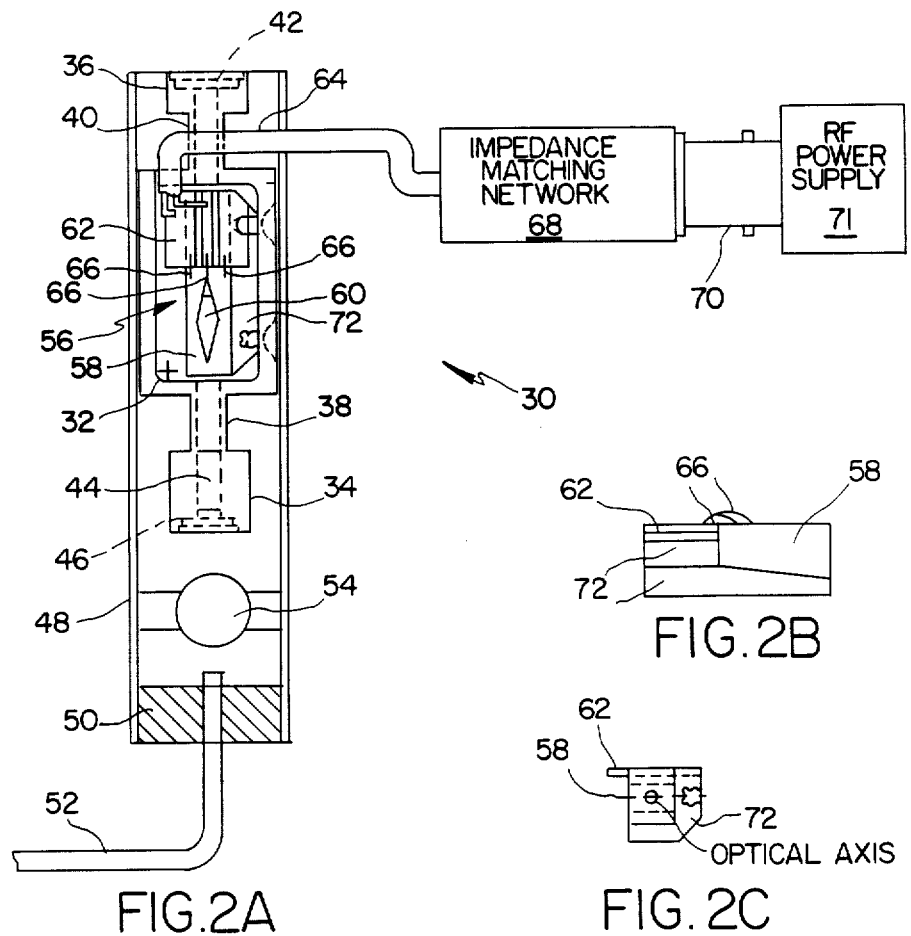
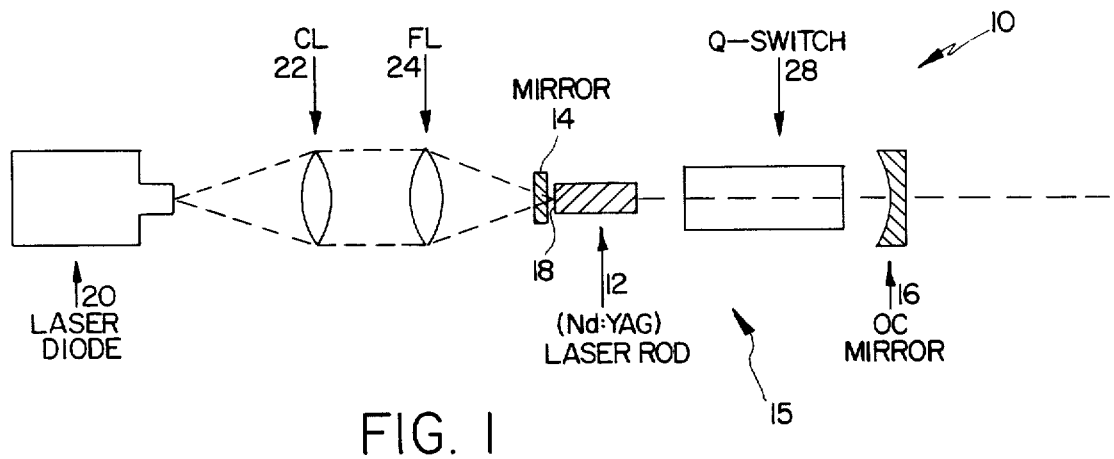

CONTINUUM GENERATION WITH MINIATURIZED Q-SWITCHED DIODE PUMPED SOLID STATE LASER

RELATED APPLICATIONS

This application is a continuation-in-part of Ser. No. 945,609 filed Dec. 23, 1986.

BACKGROUND OF THE INVENTION

The invention relates generally to solid state lasers and more particularly to Q-switched lasers for producing high peak power pulses.

Q-switching is a technique used to obtain high peak power laser pulses. Q-switching is performed by modulating the losses in a laser cavity. When cavity loss is high, pumping energy is stored in the laser gain medium by building up the population inversion; the high cavity loss prevents laser action from occurring which would deplete the stored energy. The stored energy is then extracted in a high peak power pulse by reducing the cavity losses. The use of an acousto-optic modulator inside a laser cavity for Q-switching is described in Chang, "Acousto-optic Devices and Applications," IEEE Transactions on Sonics and Ultrasonics, Vol. SU-23, No. 1, January 1976 on page 17. However, as noted therein nearly all acousto-optic Q-switches are made of fused silica. Another concern mentioned therein is the substantial RF power that must be applied to the Q-switch to prevent lasing.

U.S. patent applications Ser. No. 730,002 filed May 1, 1985, now U.S. Pat. No. 4,653,056 issued Mar. 24, 1987 and Ser. No. 811,546 filed Dec. 19, 1985 now U.S. Pat. No. 4,656,635 issued Apr. 7, 1987 describe a class of solid state lasers which are laser diode pumped in a longitudinal pumping configuration and which can be pumped in the TEM00 mode. These solid state lasers can be made extremely compact. U.S. patent application Ser. No. 864,928 filed May 19, 1986, now U.S. Pat. No. 4,665,529 issued May 12, 1987 describes a fiber optic coupled longitudinal pumping scheme which provides further miniaturization of these solid state lasers. In these lasers mode matching of the laser diode pump source to the active mode volume of the laser cavity provides for high gain in a small volume.

These solid state lasers are efficient wavelength and mode converters for diode lasers. Diode pumped lasers do not use cooling water and do not rely on broadband excitation sources. Therefore they are not subject to laser or flashlamp induced noise and exhibit greatly reduced thermal lensing. These characteristics result in excellent beam pointing stability and pulse-to-pulse stability. It is desirable to obtain these advantages in a Q-switched laser.

The typical prior art Q-switched solid state laser cannot produce the desired combination of peak power and short pulse width. A long laser rod is pumped by tungsten or arc lamps. A fused silica Q-switch is also used in the laser cavity and powered from an RF source connected to a LiNbO$_3$ transducer mounted on the silica substrate. The cavity is relatively long, typically about 1 foot and the Q-switch is large.

To form short pulses, either a short cavity or increased gain in the cavity is required, since pulse width depends on the product of gain and cavity round trip time. For a 1 foot cavity, the round trip time is about 2 ns. To obtain high gain in the cavity to compensate the long cavity length, the gain medium must be very highly pumped. Typically several KW of power are supplied to the arc lamp used to pump the laser rod (since pumping efficiency is only about 5%). However the higher gain required to obtain a desired pulse width can result in too high a pulse intensity since the total energy (product of power and pulse width) in the pulse is approximately constant and peak power increases as pulse width decreases. Therefore there is a tradeoff in obtaining the pulsewidth-energy desired. Thus, the usual results are the right peak power but too long a pulse or a sufficiently short pulse at too high peak power.

It is desirable to produce a more effective short pulse Q-switched solid state laser which provides a short pulse at low energy by using a short cavity at moderate gain instead of a longer cavity at very high gains. The aforementioned class of solid state lasers, described in the above cited patent applications, allow the resonator to be made small, typically about 1 inch long, while the efficient longitudinal diode-pumped arrangement (about 30% efficient) provides for a reasonable gain. The output can also easily be produced in TEM00 mode which is useful for many applications. Thus it will be desirable to incorporate a Q-switch into this type of solid state laser so that very short pulses can be produced at desired low energy levels but still with relatively high peak power. It is also desirable to utilize nonstandard materials for the Q-switch in order to produce a miniaturized Q-switch which fits into such a short cavity with low power pumping requirements.

Light transmitted through an optical fiber is red shifted by stimulated Raman scattering; however, the process presently requires very high power and expensive lasers. A practical source of sufficiently high power short pulses is needed to produce Raman conversion. It is thus desirable to utilize short high peak power pulses produced by a compact Q-switched laser diode pumped solid state laser for continuum generation in an optical fiber.

SUMMARY OF THE INVENTION

Accordingly, it is an object of the invention to produce a compact cavity, longitudinally diode-pumped, Q-switched solid state laser.

It is also an object of the invention to produce a Q-switched solid state laser having a relatively high gain in a relatively short cavity.

It is a further object of the invention to produce a Q-switch solid state laser having pulse widths of 50 ns or less.

It is another object of the invention to find a number of different materials for a Q-switch for a compact solid state laser.

It is also an object of the invention to provide a continuum generator using a compact Q-switched laser diode pumped solid state laser.

The invention is a laser diode pumped Q-switched solid state laser which has a short cavity length for producing very short high peak power pulses. Laser diodes are used to longitudinally end pump a rod or Nd:YAG or Nd:YLF or some other solid state material so that a small high gain cavity is produced. The cavity can be pumped to produce TEM00 mode. A small acousto-optic Q-switch made of TeO$_2$, SF$_{10}$ or LiNbO$_3$ or other material with a high acousto-optic figure of merit is also placed in the compact cavity so that stored energy in the cavity can be extracted in a short pulse The Q-switched output has applications for materials processing, link blowing in semiconductor memories, marking and scribing, or optical time domain reflectivity.

The output of a compact Q-switched laser diode pumped solid state laser is input into a single mode optical fiber which exhibits Raman gain. The optical fiber converts the solid state laser pulse, if the peak power exceeds a threshold value, to a series of bands shifted to the red which end in a continuum. Either undoubled or frequency doubled pulses from the solid state laser may be used. A compact and practical continuum generator is thereby produced which provides output at wavelengths for which there is no other source.

BRIEF DESCRIPTION OF THE DRAWINGS

In the Figures:

FIG. 1 is a schematic sectional view of a laser diode pumped Q-swtiched solid state laser oscillator.

FIGS. 2A to 2C are sectional views of a miniaturized Q-switch in a solid state laser cavity.

DETAILED DESCRIPTION OF THE PREFERRED EMBODIMENT

Figure 3:
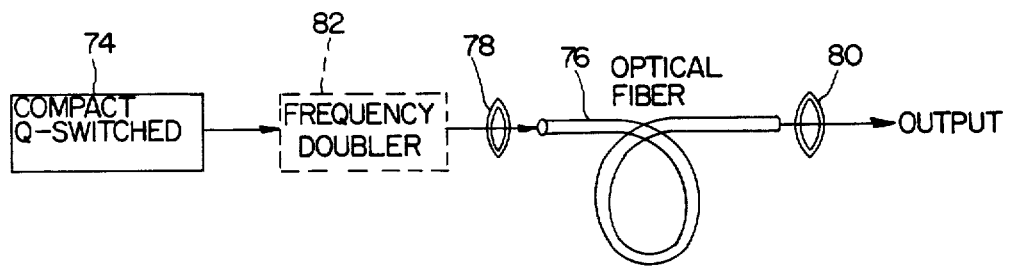
FIG. 3 is a schematic view of a continuum generator using a compact Q-switched laser dioide pumped solid state laser and an optical fiber.

A diode pumped Q-switched solid state laser oscillator 10 is shown in FIG. 1. A solid state laser rod 12 is mounted between a pair of aligned mirrors 14, 16 to form a resonator cavity 15. Mirror 16 is the output coupling mirror which is partly transmitting to the laser radiation. Mirror 14 is higly reflective to the laser radiation but transmissive to the pumping radiation. In an alternate embodiment the mirror 14 may be formed on the end face 18 of the laser rod 12. By separating mirror 14 from the end of laser rod 12 by a few millimeters the laser power is increased about 20% by eliminating spatial hole burning in the rod. A laser diode pumping source 20 is mounted to provide pumping radiation to laser rod 12. The pumping source 20 is a laser diode or laser diode array. The output of pumping source 20 is collected by a collimating lens 22 which is followed by a focussing lens 24 which longitudinally pumps laser rod 12. Other lenses to correct astigmatism may be placed between lenses 22, 24. In an alternate embodiment, the diode pumping source 20 is not mounted directly to the resonator cavity 15 but may be placed remotely and the pumping radiation transmitted through an optical fiber (as shown in FIG. 2A), which is coupled to the resonator cavity 15 to longitudinally end pump the laser rod. These solid state laser configurations are in accordance with the principles and designs of U.S. patent applications Ser. Nos. 730,002 filed May 1, 1985, now U.S. Pat. No. 4,653,056 issued Mar. 4, 1987, 811,546 filed Dec. 19, 1985, now U.S. Pat. No. 4,656,635 issued Apr. 7, 1987, and 864,928 filed May 19, 1986, which are herein incorporated by reference.

An acousto-optic Q-switch 28 is also placed in the cavity 15. Q-switch 15 provides a time dependent loss in cavity 15. An acoustic wave is produced in Q-switch 28 by applying an RF wave to a piezoelectric transducer mounted on a substrate creating a diffraction grating in the material which introduces a loss in the cavity so that rod 12 can be pumped without lasing. When the RF wave is turned off there is no longer an acoustic diffraction grating in the material so that lasing in the cavity occurs with the stored energy being dumped into a short high peak power pulse. In addition to acousto-optic elements, the Q-switch 28 could also be formed of an electro-optic element which changes its polarized state relative to a polarizer in the cavity to provide the time dependent cavity loss.

In accordance with the principles and teachings of the invention, the solid state laser cavity can be made small and the acousto-optic Q-switch can be made of a material so that it also can be made small so that it fits into the short cavity. In addition, by the longitudinal end pumped pumping scheme, the gain in the short cavity can be relatively high so that very short pulses can be produced at a desired peak power level.

The laser rod can be made of Nd:YAG which produces an output at 1.06 microns. The laser rod could alternately be made of Nd:YLF which has a longer fluorescence lifetime than Nd:YAG (480 microsec compared to 230 microsec) so that more energy can be stored. In general, the longer the lifetime of the excited states in the gain material, the greater population inversion can be stored while the Q-switch prevents lasing and the higher energy output will be obtained. Thus, longer lifetime rare earth ions could be used in place of Nd; for example Erbium (Er) or Holmium (Ho) could be used.

In order to build a small Q-switch, nonstandard materials must be used. Chang, page 7, Table I, which is herein incorporated by reference, lists a number of acousto-optic materials with their figures of merit. A small Q-switch will allow a shorter laser cavity for shorter pulses and also require lower RF power. The acousto-optic figure of merit is a measure of the extent to which diffraction is produced for a given amount of electrical energy. The higher the figure of merit, the shorter length of material is required. Preferred materials for the Q-switch of the invention include $TeO_2$, $SF_{10}$ and $LiNbO_3$, but any material with an acousto-optic figure of merit substantially greater than fused silica could be used. Alternatively, a Q-switch of electo-optic material could also be used.

An illustrative embodiment of a miniaturized Q-switched solid state laser cavity 30 is shown in FIGS. 2A to 2C. The Q-switched cavity 30 is contained in a substantially tubular resonator housing 32. The resonator housing 32 has a pair of end portions 34, 36 which extend out from narrow neck portions 38, 40. Output coupling mirror 42 is mounted in end portion 36 of housing 32 while the solid state laser rod 44 and cavity end mirror 46 are mounted in end portion 34. Mirrors 42 and 46 define the optical cavity; by bending the narrow portions 38, 40 of housing 32 optical alignment of the mirrors 42, 46 can be performed. As previously described, mirror 46 can be separate from laser rod 44 or can be formed on the end surface of the rod 44. The resonator housing 32 may be mounted in an outer laser housing 48 which contains fiber connector 50 which couples optical fiber 52 to the housing 48 to longitudinally end pump laser rod 44 from a remote laser diode pump source. The coupling connector 50 maintains fiber 52 in the proper relationship with any associated focusing optics 54 mounted in housing 48, to efficiently pump rod 44. Alternatively, the laser diode pumping source can be mounted directly in housing 48.

A miniaturized Q-switch 56 is mounted in the compact laser resonator housing 32. Q-switch 56 is made of a substrate 58 in which is mounted a small (diamond-shaped) piezoelectric transducer 60, typically made of LiNbO$_3$. A stripline 62 provides electrical connection from a coaxial cable 64 to transducer 60 (through contacts 66). The coaxial cable is connected through an impedance matching network 68 to an electrical connector 70 which is connected to a RF power supply 71. Matching network 68 prevents reflections at the load and provides for efficiently driving the piezoelectric transducer 60. The Q-switch substrate 58, as shown in the side and end views of FIGS. 2B and 2C, is canted or wedge shaped so that acoustic waves propagated through substrate 58 are not reflected back on themselves. The substrate 58 is also surrounded by an L-shaped heat sink 72 which attaches to the housing 32. In operation an RF signal is input through coaxial cable 64 to transducer 60 to generate an acoustic wave which is propagated through substrate 58 to produce a diffraction grating along the optical axis of the solid state laser resonant cavity. When the diffraction grating is present, the losses prevent lasing and allow energy to be stored in the laser rod 44. When the diffraction grating is removed, the laser produces a short high peak power pulse.

By Q-switching these small diode pumped solid state oscillators high peak short pulse width output pulses are obtained. For Nd:YAG 10 microJoule energy pulses have been obtained, while Nd:YLF has produced 20 microJoule energy pulses, at repetition rates of 1 Hz to 20 KHz, and with pulse widths of 10–50 ns. There lasers offer exceptional beam pointing stability and pulse energy stability, with beam pointing stability on the order of ±1% of the diffraction limited spot size over 10 minute time spans, and pulse to pulse stability of ±3% peak to peak. More stable performance can be achieved by a mode selection technique based on Q-switch control in which one mode is allowed to gain switch before the cavity is opened. By reducing the Q-switch RF drive level, and allowing one CW mode to oscillate, pulse stabilities of ±1.5% are achieved. Addition of an intra-cavity etalon to allow for drift in RF levels yields ±1% stability (but would require stabilization of the cavity if used over long periods of time).

Q-switched diode pumped solid state lasers give pulse widths and power levels useful for a variety of applications. The benefits of high efficiency, extended life (10,000 hours if the diode is operated at −20 C.), excellent beam pointing stability and pulse energy stability make them particularly attractive. The ability to produce TEMOO mode is also advantageous, particularly for focussing to a small spot without mode structure. One application is materials processing, in particular link blowing in semiconductor memories. It is necessary to focus the beam to a 1 micron spot, for which TEMOO mode is particularly suitable. In order to burn out the aluminum or tungsten silicate links, pulse to pulse stability is required. Another application is marking or scribing on discrete semiconductor components, printed circuit boards, silk screens and a wide variety of other materials. A pulse of about 20 ns could be used to perform optical time domain reflectometry (OTDR) in which a pulse is propagated through a long optical fiber cable to detect defects.

A compact laser diode pumped Q-switched solid state laser produces short pulses with sufficient peak power to utilize the stimulated Raman scattering phenomenon in an optical fiber to produce red shifted bands which form a continuum over a useful part of the spectrum. The physical phenomenon of Raman generation is described in *Optical Fiber Telecommunications*, Ed. by S. E. Miller and A. G. Chynoweth, Academic Press Inc., Ch 5 Nonlinear Properties of Optical Fibers, pp. 127–132. Accordingly, a Q-switched solid state laser of the invention can be combined with an optical fiber to form a Raman continuum generator.

As shown in FIG. 3, the output of a miniaturized Q-switched laser diode pumped solid state laser 74 is directly coupled into a single mode optical fiber 76 (without the use of frequency doubler 82). The output of the laser is coupled into the fiber by any conventional means such as lens 78. The output from the fiber is obtained through any conventional means such as lens 80. The smallest core is preferred since the smaller area of confinement results in higher intensity, which allows the use of a shorter fiber or lower power pump source. In addition the spatial quality of the beam will be single mode. However, for cost considerations, standard communications fibers can be used. The most common single mode fiber has a 10 micron diameter core and a cutoff of 1.3 microns (any light to the red of the cutoff will be TEMOO). An alternative standard single mode fiber has a 4 micron core and a 800 nm cutoff. A typical fiber length is 1 km, although lengths from 200–300 m and up can be used.

In the optical fiber the pump wavelength (output from the solid state laser) is shifted by stimulated Raman scattering; additional bands appear at slightly redder wavelengths, with a shift of about 400 cm$^{-1}$ (350–500 cm$^{-1}$). There is sufficient gain so that each band becomes intense enough to launch its own band. Because of the width of the shift, a narrow band input produces a broader band output. Thus each successive band gets broader and broader so that by the fourth or fifth band a continuum is formed. All the bands are produced in a single pass through the fiber; each band pumps the next band and each is converted a little further along the fiber. The process is a threshold process; below a certain power no conversion occurs while above the threshold everything is converted toward the red. The process depends on the peak power, core size, and fiber length. A longer fiber results in more stable bands near the pump band and extends the bands (continuum) farther away from the original wavelength. Of course, a higher intensity source allows a shorter fiber. As the pulses shift to the red, shorter pulses are produced.

Figure 4:
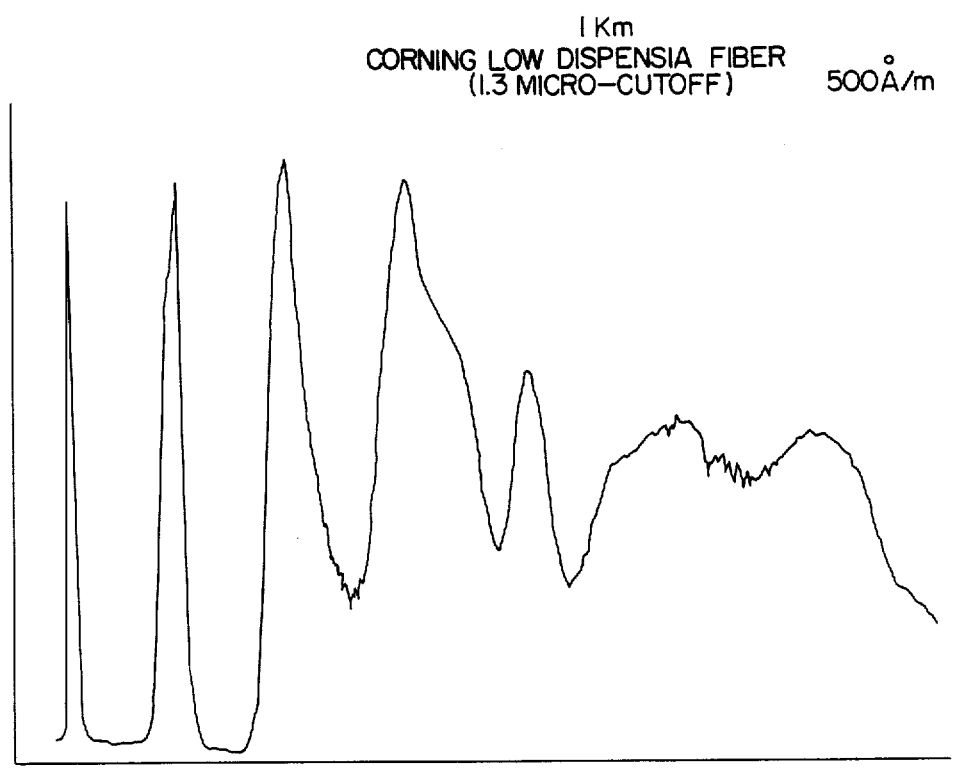
FIG. 4 is a graph of the output of a continuum generator as a function of wavelength.

The Q-switched laser diode pumped solid state lasers as previously described are ideal pumping sources for the Raman fiber continuum generator. The output of a continuum generator according to the invention using a miniaturized Q-switched Nd:YLF laser operating at 1.04 microns to pump a 1 km 10 micron core Corning low dispersion fiber (1.3 micron cutoff) is shown in FIG. 4. Four discrete bands followed by a continuum band extending to 1.5 microns are produced. Although a material such as YLF with a longer lifetime is particularly preferred because more energy can be dumped into the Q-switched pulse, other materials such as Nd:YAG at 1.06 microns can also be used. Any compact Q-switched solid state laser of the type described can be used as the pumping source for a Raman continuum generator provided the pulses have peak power which exceeds the threshold value of the fiber.

In an alternate embodiment of the continuum generator, a frequency doubled Q-switched solid state laser is used as the pump source. As shown in FIG. 3, the output of Q-switched laser 74 is passed through frequency doubler 82 prior to coupling into fiber 76. The output of the Q-switched laser can be passed through a frequency doubling crystal prior to coupling into the fiber, as shown in FIG. 3, or the doubling crystal can be placed in the laser cavity itself, i.e. included in laser 74. Thus a frequency doubled Q-switched Nd:YLF laser would produce a pump band at 0.52 microns (green) followed by a plurality of red shifted bands ending in a continuum in the red (or the yellow if a lower intensity source is used).

The continuum generator provides a broadly tunable source having a continuum in the 1.2 or 1.3 to 1.5 micron region and a number of discrete bands between the continuum and pump band; the continuum may be extended depending on the pump wavelength and by using a frequency doubled pump source. For the frequency doubled pump source the continuum will extend from 600 nm to 750 nm. The output from the fiber may be tuned off a grating. The continuum generator provides a continuum in the 1.3–1.5 micron region which is important for communications, as well as particular wavelengths for which there are few, if any, alternate sources such as dye lasers. The continuum generator is compact and low cost using the short cavity, efficient Q-switch and high peak power of the laser pumping source with a standard optical fiber. The compact laser diode pumped Q-switched solid state lasers are the smallest lasers which have sufficient power to generate stimulated Raman scattering. Thus the combination of these lasers with a single mode fiber provides a practical, compact, low cost continuum generator which is not otherwise available.

The coherent high power laser diode pumping source according to the invention includes laser diode arrays in which a plurality of diode emitters (typically 10 or more) are phase locked together and a multi-spatial mode extended emitter laser diode. The diode arrays are exemplified by gallium aluminum arsenide (GaAlAs) laser diode arrays Model No. 2410 manufactured by Spectra Diode Labs, San Jose, Calif. The single broad stripe or extended emitter laser diodes are exemplified by Sony Corp. Model Nos. SLD 301V/w having output power of 100 mw; SLD 302V/w (200 mw); SLD 303V/w (500 mw); SLD 304 V/w (1000 mw), as described in Sony News and Information Bulletin No. 87S-013, 1987, and Sony Semiconductor Data Book 1987 AlGaAs Laser Diodes, which are herein incorporated by reference.

Changes and modifications in the specifically described embodiments can be carried out without departing from the scope of the invention which is intended to be limited only by the scope of the appended claims.

We claim:

1. A continuum generator comprising:
    a single mode optical fiber exhibiting Raman gain above a threshold pulse power;
    a compact Q-switched laser diode pumped solid state laser producing pulses having a peak power above the threshold for Raman generation in the fiber, the pulses from the laser being input into the fiber for transmission through the fiber.

2. The continuum generator of claim 1 wherein the fiber has a 10 micron core and 1.3 micron cutoff.

3. The continuum generator of claim 1 wherein the fiber has a 4 micron core and 0.8 micron cutoff.

4. The continuum generator of claim 1 wherein the fiber has a length of about 1 km.

5. The continuum generator of claim 1 wherein the fiber has a length of at least about 200–300 m.

6. The continuum generator of claim 1 wherein the solid state laser comprises:
    a miniaturized solid state laser rod;
    cavity means defining a compact resonant cavity which contains the laser rod, including output coupling means;
    laser diode pumping means positioned to longitudinally end pump the laser rod and to match the pumping volume to the mode volume of the laser rod;
    a miniaturized Q-switch mounted in the resonant cavity.

7. The continuum generator of claim 6 wherein the laser rod is made of Nd:YLF or Nd:YAG.

8. The continuum generator of claim 6 wherein the laser rod is made of a solid state laser material doped with neodymium, erbium or holmium.

9. The continuum generator of claim 6 wherein the Q-switch is a miniaturized acousto-optic Q-switch.

10. The continuum generator of claim 9 wherein the Q-switch comprises a substrate of material having an acoustooptic figure of merit substantially greater than fused silica positioned on the optical axis of the resonant cavity, a piezoelectric transducer mounted on the substrate, and means for connecting the piezoelectric transducer to an RF source to drive the transducer and generate an acoustic diffraction grating in the substrate.

11. The continuum generator of claim 10 wherein the substrate is selected from $TeO_2$, $SF_{10}$, and $LiNbO_3$.

12. The continuum generator of claim 1 further including frequency doubling means for frequency doubling the output of the laser prior to coupling the output into the fiber.

13. The continuum generator of claim 12 wherein the frequency doubling means is a frequency conversion crystal.

14. A method of generating a series of bands including a continuum, comprising:
    forming a compact solid state laser resonator with a miniaturized solid state laser rod;
    pumping the laser rod with a laser diode pumping source;
    matching the pumping volume to the lasing volume in the laser rod;
    creating an acoustic diffraction grating in a miniaturized Q-switch in the resonant cavity to prevent lasing while energy is stored in the laser rod;
    turning off the acoustic diffraction grating to extract the stored energy in the laser rod in a short high peak power pulse;
    pumping a single mode optical fiber with the pulses.

15. The method of claim 14 further including frequency doubling the pulse from the laser rod prior to pumping the fiber.

16. The method of claim 14 further comprising forming the laser rod of Nd:YAG or Nd:YLF.

17. The method of claim 14 further comprising forming the fiber of a conventional communications fiber having a 10 micron core and 1.3 micron cutoff.

18. The method of claim 17 further comprising forming the fiber of a length of at least about 200–300 m.

19. The method of claim 14 including forming the miniaturized Q-switch of a material having an acoustooptic figure of merit substantially greater than fused silica.

20. The method of claim 19 including forming the Q-switch from $TeO_2$, $SF_{10}$, or $LiNbO_3$.

* * * * *